UNITED STATES PATENT OFFICE.

HENRY A. GARDNER AND ELIAS BIELOUSS, OF WASHINGTON, DISTRICT OF COLUMBIA; SAID BIELOUSS ASSIGNOR TO SAID GARDNER.

PREPARATION OF DRYING OILS FROM HYDROCARBONS.

1,384,447.     Specification of Letters Patent.     Patented July 12, 1921.

No Drawing.     Application filed December 9, 1919.  Serial No. 343,458.

*To all whom it may concern:*

Be it known that we, (1) HENRY A. GARDNER, a citizen of the United States, and (2) ELIAS BIELOUSS, a citizen of the Republic of Russia, who has declared his intention of becoming a citizen of the United States, both residing at Washington, in the District of Columbia, have invented certain new and useful Improvements in the Preparation of Drying Oils from Hydrocarbons, of which the following is a specification.

It is known that unsaturated compounds may be prepared from mineral oils, or distillates therefrom, by a process involving the chlorination of the oil and the subsequent elimination of chlorin. The present invention relates to processes of this general type, and comprises a process whereby the transformation of saturated to unsaturated hydrocarbons, the latter possessing film-forming qualities which are similar to those of linseed and other drying oils, may be economically and efficiently carried out.

We have discovered that under certain conditions involving dechlorination of chlorinated hydrocarbons at moderate temperatures, it is possible to obtain therefrom in excellent yields and without formation of substantial proportions of objectionable by-products, drying oils which have the desirable film-forming qualities of linseed oil, and which may be used alone, or in mixture with other drying oils or with diluents of various kinds, both as varnishes and as paint vehicles. According to our invention the dechlorination is effected at an elevated temperature, preferably about 160–210° C., but not exceeding 250° C. Dechlorination at higher temperatures than these, say around 300° C., tends to the production of resinous masses presenting somewhat the appearance of asphalt and unsuitable for the purpose of this invention.

Following are certain preferred procedures in accordance with our invention, it being understood that the invention is not limited to the specific conditions hereinafter described by way of example.

A mineral oil or distillate, which may be either of paraffin or asphaltic base, but which consists largely of saturated hydrocarbons, is subjected in any suitable acid-proof container to chlorination, preferably by the direct action of moist chlorin or gases containing the same. The presence of moisture appears to accelerate the reaction, and chlorin as evolved from electrolytic cells of the known type is well suited for our purposes. In absence of moisture the chlorination is conveniently carried out in lead or iron containers. Hydrochloric acid is evolved throughout the above treatment, which may take place at normal or higher temperatures; and may be absorbed in water or otherwise recovered. As the chlorination proceeds the oil rises in specific gravity and acquires a deeper color. Preferably we continue the chlorination until the oil has absorbed 30–60 parts by weight of chlorin, although our invention is not restricted to these particular proportions.

The chlorinated product, however it may be prepared, is now subjected to partial or complete dechlorination under such conditions as to avoid the formation in substantial quantity of solid or undissolved resinous or asphaltic reaction products. For this purpose the following procedures have proven satisfactory:

The chlorinated product is dissolved in any appropriate neutral solvent, such for example as kerosene. The resulting solution is heated in an oil bath, preferably to a temperature of about 180–210° C., and preferably also in presence of a substance capable of combining with hydrochloric acid or of accelerating the reaction. Such substance may comprise a metal (iron, zinc, aluminum, etc.) usually in powder form; or a metal oxid (magnesium oxid or zinc oxid); or mixtures of such metals and oxids. Under the conditions described dechlorination proceeds smoothly and rapidly, yielding a product which after filtration or settling consists of an oily usually dark brown liquid, having approximately the fluidity of linseed oil, and easily spread under the brush. The resulting film possesses the drying qualities essential for paint vehicles, varnishes, etc., the film apparently hardening through oxidation as in the case of the drying oils. The dechlorinated product thus prepared is found to be miscible with linseed oil, turpentine, benzene and other solvents, as well as with the usual liquid driers, such for example as lead-manganese lineolate in turpentine solution. The color of the product will vary considerably according to the specific conditions used, and may if desired be improved by treatment with or filtration through fullers' earth, boneblack or like decolorants. The product is well suited for direct use in the paint and varnish arts, although if desired a part or all of the added solvent (kerosene or the like) may be removed by distillation after the dechlorinating step, and may be replaced by other solvent, thinner, or like material as may be desirable for any particular use.

It is not necessary in all cases that the chlorin should be quantitatively removed, since the last portions of chlorin are held in exceedingly stable combination and do not interfere with the ordinary uses of the product.

Instead of dissolving the chlorinated hydrocarbon preparatory to effecting the removal of chlorin, we may treat the chlorinated material directly with steam, preferably superheated to a temperature of 130–220° C., until all or the major portion of the chlorin has been eliminated. This operation also may be accelerated by the addition of suitable catalysts or accelerators, such for example as metals or metallic oxids or mixtures thereof as described above. The oil remaining in the reaction vessel is separated from any water derived from the steam by condensation, and after filtration is ready for use, being thinned if necessary by the use of any of the usual thinners or diluents.

If desired combinations of the two processes described above may be used: that is to say the chlorinated product may be dissolved in a suitable solvent, and subjected in such solution to dechlorination by superheated steam. The solvent in such case should be one which is not readily capable of distillation with steam at the operating temperature, for example a hydrocarbon such as a high-boiling kerosene fraction, pine-oil, or the like.

While we prefer to use chlorin, other halogens or halogen mixtures may be substituted therefor without departing from this invention.

The following specific examples are not restrictive but will serve to illustrate the invention:

Example I: 100 parts by weight of a mineral oil having a gravity of 0.889 are chlorinated with moist chlorin until the weight of the oil increases to 140 parts, the hydrochloric acid being collected as evolved. The resulting product, containing about 28% chlorin, is dissolved in 140 parts of kerosene having a boiling point of about 250° C. To this solution 30 parts of iron filings and 2 parts of aluminum powder are added, and the whole is heated in an oil bath for 4½ hours at about 190° C.

Example II: The conditions are as in Example I, except that the dechlorination is effected in presence of 35 parts of zinc dust and 2 parts of copper, the mixture being heated in the oil bath for 4 hours at about 180° C.

Example III: The conditions are as described in Example I, except that dechlorination is effected in presence of 16 parts of magnesium oxid, the mixture being heated to 200–210° C. for about 8 hours.

Example IV: 250 parts by weight of a mineral oil of specific gravity 0.889 are chlorinated with moist chlorin until the weight of the product is increased to 400 parts. Superheated steam at 170–180° C. is passed through the chlorinated oil for 5 hours, or until the distillate contains in the form of hydrochloric acid substantially the equivalent of the chlorin combined with the oil. The oil is then separated from water due to condensation of the steam, filtered and thinned as desired for use.

Example V: The chlorination and dechlorination are carried out as in Example IV, but with the addition during dechlorination of a small proportion (10 parts or less) of a metal powder such as iron, zinc, or copper, or of an oxid such as magnesium oxid, zinc oxid or cupric oxid, all of which serve to accelerate the splitting off of the hydrochloric acid.

We claim:—

1. In a process of preparing drying oils from chlorinated hydrocarbons, the step which consists in eliminating the bulk of the chlorin from the chlorinated hydrocarbon at an elevated temperature not exceeding 250° C., whereby the formation of resinous residues is largely prevented.

2. In a process of preparing drying oils from chlorinated hydrocarbons, the step which consists in eliminating the bulk of the chlorin from the chlorinated hydrocarbon at an elevated temperature not exceeding 250° C., and in presence of an accelerant for the reaction, whereby the formation of resinous residues is largely prevented.

3. In a process of preparing drying oils from chlorinated hydrocarbons, the step which consists in eliminating the bulk of the chlorin from the chlorinated hydrocarbon at an elevated temperature not exceeding 250° C. and in presence of a reagent capable of combining with hydrochloric acid, whereby the formation of resinous residues is largely prevented.

4. In a process of producing drying oils from chlorinated hydrocarbons, the step which consists in removing chlorin from the material in presence of a solvent for the chlorinated body.

5. In a process of producing drying oils from chlorinated hydrocarbons, the step which consists in removing chlorin from the material in presence of a hydrocarbon solvent for the chlorinated body.

6. In a process of producing drying oils from chlorinated hydrocarbons, the step which consists in removing chlorin from the material in presence of a solvent for the chlorinated body and an accelerator for the reaction.

7. In a process of producing drying oils from chlorinated hydrocarbons, the step which consists in removing chlorin from the material in presence of a hydrocarbon solvent for the chlorinated body and an accelerator for the reaction.

8. In a process of producing drying oils from chlorinated hydrocarbons, the step which consists in removing chlorin from the material by means of superheated steam.

9. In a process of producing drying oils from chlorinated hydrocarbons, the step which consists in removing chlorin from the material by means of superheated steam in presence of an accelerator for the reaction.

10. Process of preparing drying oils from hydrocarbons, comprising chlorinating the hydrocarbon, adding a solvent, and dechlorinating the material in presence of said solvent.

11. Process of preparing drying oils from hydrocarbons, comprising chlorinating the hydrocarbon, adding a solvent in proportion to yield a final produce having approximately the flowing qualities of linseed oil, and dechlorinating the material in presence of said solvent.

12. Process of preparing drying oils from hydrocarbons, comprising chlorinating the hydrocarbon, adding a solvent, and dechlorinating the material in presence of said solvent by heating the mixture in contact with an accelerant for the reaction.

In testimony whereof we affix our signatures.

HENRY A. GARDNER.
ELIAS BIELOUSS.